United States Patent
Eggers et al.

(10) Patent No.: US 9,336,125 B2
(45) Date of Patent: May 10, 2016

(54) SYSTEMS AND METHODS FOR HARDWARE-ASSISTED TYPE CHECKING

(75) Inventors: Susan J. Eggers, Seattle, WA (US); Luis Ceze, Seattle, WA (US); Emily Fortuna, Seattle, WA (US); Owen Anderson, San Jose, CA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 679 days.

(21) Appl. No.: 13/594,607

(22) Filed: Aug. 24, 2012

(65) Prior Publication Data

US 2013/0145216 A1 Jun. 6, 2013

Related U.S. Application Data (60) Provisional application No. 61/526,923, filed on Aug. 24, 2011.

(51) Int. Cl.
| G06F 11/00 | (2006.01) |
| G06F 11/36 | (2006.01) |
| G06F 11/07 | (2006.01) |
| G06F 9/45  | (2006.01) |

(52) U.S. Cl.
CPC ............ G06F 11/3668 (2013.01); G06F 8/437 (2013.01); G06F 11/0712 (2013.01); G06F 11/0772 (2013.01)

(58) Field of Classification Search
USPC .................................................. 714/42, 25
See application file for complete search history.

(56) References Cited

U.S. PATENT DOCUMENTS

| 7,543,132 B1* | 6/2009 | Grohoski et al. ............. 711/204 |
| 2003/0135787 A1* | 7/2003 | DeWitt et al. ................... 714/30 |
| 2004/0128657 A1 | 7/2004 | Ghiya |
| 2004/0199816 A1* | 10/2004 | Paredes et al. .................. 714/25 |
| 2006/0020946 A1 | 1/2006 | Alexander, III |
| 2006/0026469 A1* | 2/2006 | Yokoi ............................. 714/48 |
| 2009/0132848 A1* | 5/2009 | Martin ............................. 714/2 |
| 2009/0282288 A1* | 11/2009 | Wang et al. ..................... 714/37 |
| 2010/0088679 A1 | 4/2010 | Langworthy |

(Continued)

OTHER PUBLICATIONS

Anderson, O., et al., "Checked Load: Architectural Support for JavaScript Type-Checking on Mobile Processors," Proceedings of the IEEE 17th International Symposium on High Performance Computer Architecture (HPCA), San Antonio, Texas, Feb. 12-16, 2011, 22 pages.

(Continued)

*Primary Examiner* — Sarai Butler
(74) *Attorney, Agent, or Firm* — Christensen O'Connor Johnson Kindness PLLC (57) ABSTRACT

Devices and methods of providing hardware support for dynamic type checking are provided. In some embodiments, a processor includes a type check register and support for one or more checked load instructions. In some embodiments, normal load instructions are replaced by a compiler with the checked load instructions. In some embodiments, to perform a checked load, an error handler instruction location is stored in the type check register, and a type tag operand is compared to a type tag stored in the loaded memory location. If the comparison succeeds, execution may proceed normally. If the comparison fails, execution may be transferred to the error handler instruction. In some embodiments, type prediction is performed to determine whether a checked load instruction is likely to fail.

20 Claims, 6 Drawing Sheets

(56) References Cited

U.S. PATENT DOCUMENTS

| | | | | |
|---|---|---|---|---|
| 2010/0251036 | A1* | 9/2010 | Moyer | 714/53 |
| 2010/0313061 | A1* | 12/2010 | Huth et al. | 714/2 |
| 2011/0138122 | A1* | 6/2011 | Hughes et al. | 711/117 |
| 2012/0131386 | A1* | 5/2012 | Fournier et al. | 714/35 |
| 2012/0284562 | A1* | 11/2012 | Sankaralingam et al. | 714/16 |

OTHER PUBLICATIONS

Brooks, R.A., et al., "Design of an Optimising, Dynamically Retargetable Compiler for Common Lisp," Proceedings of the ACM Symposium on Lisp and Functional Programming, Cambridge, Mass., Aug. 4-6, 1986, pp. 67-85.

Chambers, C., and D. Ungar, "Customization: Optimizing Compiler Technology for SELF, a Dynamically-Typed Object-Oriented Programming Language," in R.L. Wexelblat (ed.), "Proceedings of the ACM SIGPLAN'89 Conference on Programming Language Design and Implementation (PLDI)," Portland, Ore., Jun. 21-23, 1989, pp. 146-160.

Corley, C.J., and Statz, J.A., "LISP Workstation Brings AI Power to a User's Desk," Computer Design, Jan. 1985, pp. 155-162.

Deutsch, L.P., and Schiffman, A.M., "Efficient Implementation of the Smalltalk-80 System," Proceedings of the 11th ACM SIGACT-SIGPLAN Symposium on Principles of Programming Languages (POPL), Salt Lake City, Utah, Jan. 1984, pp. 297-302.

"ECMAScript Language Specification," Standard ECMA-262, 5.1 Edition, ECMA International, Geneva, Jun. 2011, 258 pages.

Gal, A., et al., "HotpathVM: An Effective JIT Compiler for Resource-Constrained Devices," Proceedings of the 2nd International Conference on Virtual Execution Environments (VEE), Ottawa, Jun. 14-16, 2006, pp. 144-153.

Gal, A., et al., "Trace-Based Just-in-Time Type Specialization for Dynamic Languages," Proceedings of the ACM SIGPLAN Conference on Programming Language Design and Implementation (PLDI), Dublin, Ireland, Jun. 15-21, 2009, pp. 465-478.

Hölzle, U., and D. Ungar, "Optimizing Dynamically-Dispatched Calls With Run-Time Type Feedback," Proceedings of the ACM SIGPLAN Conference on Programming Language Design and Implementation (PLDI), Orlando, Florida, Jun. 20-24, 1994, pp. 326-336.

Luk, C.-K., et al., "Pin: Building Customized Program Analysis Tools With Dynamic Instrumentation," Proceedings of the ACM SIGPLAN Conference on Programming Language Design and Implementation (PLDI), Chicago, Jun. 12-15, 2005, pp. 190-200.

Mahmood, A., and E.J. McCluskey, "Concurrent Error Detection Using Watchdog Processors—A Survey," IEEE Transactions on Computers 37(2):160-174, Feb. 1988.

Moon, D.A., "Architecture of the Symbolics 3600," Proceedings of the 12th International Symposium on Computer Architecture (ISCA), Boston, Jun. 17-19, 1985, pp. 76-83.

Patil, H., and C. Fischer, "Low-Cost, Concurrent Checking of Pointer and Array Accesses in C Programs," Software—Practice and Experience 27(1):87-110, Jan. 1997.

Richards, G., et al., "An Analysis of the Dynamic Behavior of JavaScript Programs," Proceedings of the ACM SIGPLAN Conference on Programming Language Design and Implementation (PLDI), Toronto, Jun. 5-10, 2010, pp. 1-12.

Steele, G.L., Jr., "Fast Arithmetic in MacLISP," AI Memo 421, Massachusetts Institute of Technology, Artificial Intelligence Laboratory Publications, Sep. 1977, 11 pages.

Steenkiste, P., and J. Hennessy, "LISP on a Reduced-Instruction-Set-Processor," Proceedings of the ACM Symposium on LISP and Functional Programming (LFP), Cambridge, Mass., Aug. 4-6, 1986, pp. 192-201.

Steenkiste, P., and J. Hennessy, "Tags and Type Checking in LISP: Hardware and Software Approaches," Proceedings of the 2nd International Conference on Architectural Support for Programming Languages and Operating Systems (ASPLOS II), Palo Alto, Calif., Oct. 5-8, 1987, pp. 50-59.

Taylor, G.S., et al., "Evaluation of the SPUR Lisp Architecture," ACM SIGARCH Computer Architecture News—Special Issue: Proceedings of the 13th Annual International Symposium on Computer Architecture (ISCA) 14(2):444-452, May 1986.

White, J.L., "Reconfigurable, Retargetable Bignums: A Case Study in Efficient, Portable Lisp System Building," Proceedings of the ACM Symposium on LISP and Functional Programming (LFP), Cambridge, Mass., Aug. 4-6, 1986, pp. 174-191.

Yeh, T.-Y., and Y.N. Patt, "Two-Level Adaptive Training Branch Prediction," Proceedings of the 24th Annual International Symposium on Microarchitecture (MICRO), Albuquerque, N.M., Nov. 18-20, 1991, pp. 51-61.

"V8 JavaScript Engine," Google Inc., <http://code.google.com/p/v8> [retrieved Jun. 5, 2015], 2008, 2 pages.

"The Snapdragon Platform," Qualconnm, <http://www.qualcomm.com/products/snapdragon> [retrieved Jun. 5, 2015], 10 pages.

Stachowiak, M., "Introducing SquirrelFish Extreme," Surfin' Safari WebKit, Sep. 18, 2008, <http://webkit.org/blog/214/introducing-squirrelfish-extreme/>[retrieved Jun. 5, 2015], 4 pages.

"Type System," Wikipedia, The Free Encyclopedia, Aug. 10, 2011, <https://en.wikipedia.org/w/index.php?title=Type_system&oldid=444026564#Dynamic_typing> [retrieved Jun. 15, 2015], 14 pages.

* cited by examiner

```
FastPath:
    // Load virtual registers
    mov   %rax -> %rdx
    mov   0x10(%r13) -> %rax // Guard for integer
    cmp   %r14, %rdx
    jb    SlowCase
    mov   %edx -> %edx // Guard for JSCell
    test  %rax, %r15
    jne   SlowCase
    mov   $0x797d10, %r11

// Guard for JSArray
    cmp   %r11, (%rax)
    jne   SlowCase
    mov   0x38(%rax) -> %rcx // Guard for array length
    cmp   0x30(%rax), %edx
    jae   SlowCase
    mov   0x20(%rcx,%rdx,8) -> %rax // Guard null array pointer
    test  %rax, %rax
    je    SlowCase // Store to array
    mov   %rax, 0x18(%r13)
    ...
SlowCase:
    ...
```

*Fig.1.*

```
TypeGuard:
    mov    &ErrorHandler -> %Chk1Reg
    chk1b  0(%MemLoc), 0xFF -> %DestReg
    ...
ErrorHandler:
    ...
```

*Fig.2A.*

```
IntGuard:
    mov     &ErrorHandler -> %Chk1Reg
    chk1bn  0(%MemLoc), 0xFF -> %DestReg
TypeGuard:
    mov     0xFF..FF -> %TagReg
    chk1w   0(%DestReg), %TagReg -> %DestReg2
ErrorHandler:
    ...
```

SYSTEMS AND METHODS FOR HARDWARE-ASSISTED TYPE CHECKING

CROSS-REFERENCE TO RELATED APPLICATION

This application claims the benefit of U.S. Provisional Application No. 61/526,923, filed Aug. 24, 2011, the entire disclosure of which is hereby incorporated by reference for all purposes.

STATEMENT OF GOVERNMENT LICENSE RIGHTS

This invention was made with government support under Grant Nos. DGE-0946804, DGE-0718124, and CCF-0702225, awarded by National Science Foundation. The government has certain rights in the invention.

BACKGROUND

Dynamically typed languages such as JavaScript, in which a majority of type checking is performed at run-time instead of at compile-time, have become a de-facto standard for web-based applications. However, generating efficient code for dynamically typed languages is a challenge, because such languages require frequent dynamic type checks. An average of 12.9% of the instructions of a typical program relate to type checks, while some programs may have type check instructions that constitute twenty percent or more of their total instructions. As so many of the total instructions of a typical program are used for type checking, the overall efficiency of such a program could be greatly improved by improving the efficiency of type checking.

Meanwhile, innovations in mobile device programmability have opened up embedded targets to the same class of programmers as general web applications, instead of the specialized embedded developers of the past, by providing support for the execution of dynamically typed languages. Embedded processors for mobile devices typically do not employ traditional heavy-weight architectural techniques for improving the efficiency of code execution. Instead, light-weight, minimal techniques are used. For such light-weight architectures originally designed for executing languages such as C, dynamically typed languages pose special performance problems.

What is needed is a light-weight architecture that can improve the efficiency of execution of dynamically typed languages on any sort of computing device, but particularly on mobile computing devices.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computing device configured to execute dynamically typed programming languages is provided. The computing device comprises circuitry configured to execute a checked load instruction and a type check register configured to store a location of an error handler. The checked load instruction is configured to accept at least a source memory location operand, a destination memory location operand, and a type tag operand.

In some embodiments, a method of performing type checking during execution of a program in a dynamically typed programming language is provided. The method comprises storing, in a type check register, an error handler instruction location; comparing a type tag operand to a portion of memory associated with a source memory location indicated by a source memory location operand to determine whether the type tag matches a type specified in the portion of memory; in response to determining that the type tag matches the type specified in the portion of memory, transferring execution to a subsequent instruction; and in response to determining that the type tag does not match the type specified in the portion of memory, transferring execution to an instruction at the error handler instruction location stored in the type check register.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments of the present disclosure, light-weight hardware extensions are used to improve the efficiency of type checking for dynamically typed languages. A processor is provided that supports one or more checked load instructions. Such instructions may be implemented using only a handful of basic hardware components the size of a comparator or multiplexer (MUX) for implementation, and may improve performance between 11.2% and 44.6% without slowing down a microarchitectural critical path. Dynamic type prediction may also be used to provide additional performance improvements.

As understood by one of ordinary skill in the art, the term "instruction" may include machine-readable code that, if received by a processor, causes the processor to perform one or more actions associated with the machine-readable code. As used herein, the term 'instruction' may include the machine-readable code itself, may include a human-readable version of the machine-readable code (such as an assembly language statement and/or the like), and/or may include the one or more actions the processor is configured to perform upon receiving the machine-readable code.

Figure 1:
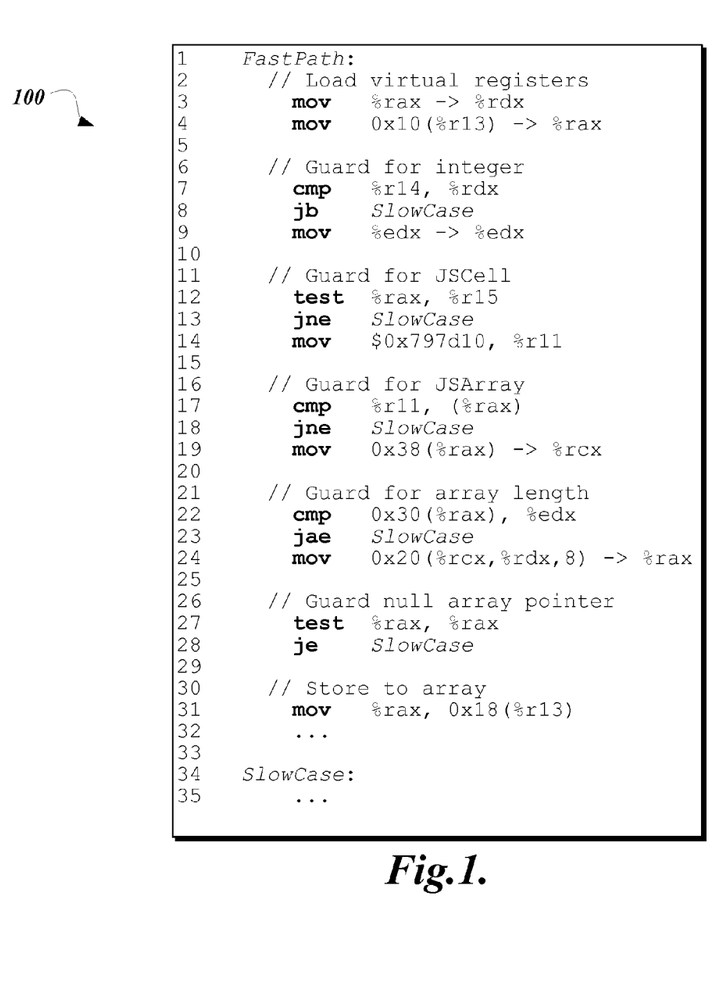
FIG. 1 illustrates a typical assembly language listing generated by a traditional JavaScript just-in-time compiler having a macro-expansion code generator designed for low-latency code generation.

FIG. 1 illustrates a typical assembly language listing 100 generated by a traditional JavaScript just-in-time compiler having a macro-expansion code generator designed for low-latency code generation. The illustrated listing 100 is an example generated by the Nitro JavaScript virtual machine, available from Apple, Inc. Compilation occurs in two phases: the first phase lowers JavaScript source code to a linear bytecode representation composed of "macro-ops" that represent the instructions of the program at a relatively high level; the second phase compiles each bytecode to assembly language or machine code, performing no optimization across macro-op boundaries.

In traditional JavaScript virtual machine (VM) implementations, values (regardless of type) may be represented as machine-word-sized virtual registers, the high bits of which are used to store a type tag. For primitive integer-type data, the remaining bits are the value of the reduced-width integer. For other types of data, the remaining bits are a pointer into a memory allocation pool from which the address of the object may be obtained. Given this structure, in order to access a value at a memory location, a sequence of mask instructions first extracts the value of the tag from the memory location. This is then followed by a branch on the tag value, either to a fast-path block if the comparison succeeds, or to an error recovery block if the comparison fails. In the fast-path block, the value at the memory location is extended and used in the type-appropriate computation. In the error recovery block, instructions are performed to recover from the incorrect type value.

In some embodiments, particular encodings may be used for tags to gain added efficiencies. For example, the type tag that indicates an integer may be set to all ones. In such a case, two's complement arithmetic operations may be issued on integer values without the need to mask out the tag bits beforehand.

The illustrated listing 100 shows an assembly language listing generated for an indexed array store macro-op. A comparable implementation for a non-type-checked language, such as C, would be a single store instruction with a base-plus-offset addressing mode. However, even in the illustrated fast path for this type checked example, the macro-op performs five separate guards: that the index is an integer (lines 7-9), that the destination is non-primitive (lines 12-14), that the destination is an array (lines 17-19), that the length of the array is not zero (lines 22-24), and that the data pointer is not null (lines 27-28). It is clear from this listing 100 that a large number of type checks are performed for even simple common instructions, and so the more such instructions can be optimized, the better overall performance will be.

To reduce the performance impact of dynamic type checking, embodiments of the present disclosure provide one or more instruction set extensions that may be referred to as "checked load" instructions. These instructions provide hardware-based support for streamlining type checking. In some embodiments, a checked load instruction compares an expected type to a type of data stored in a memory location, and if the comparison fails, execution is transferred to an error handler location stored in a register added to the processor hold such locations. In some embodiments, more than one instruction may be provided in order to efficiently support various situations. Accordingly, in some embodiments, a processor may be provided that includes a type check register and support for performing the following instructions:

1. chklb—This instruction supports operands including a source memory location operand indicating a memory location of data to be loaded, a destination memory location operand indicating a word-sized register to which the data is meant to be loaded, and a type tag operand indicating a byte-sized immediate value specifying a type tag that represents the type of data to be loaded.
2. chklbn—This instruction is substantially similar to chklb, except that the result of the tag comparison is negated before determining whether control should be transferred to the error handler location. That is, control will be transferred if the type tag matches the type of data at the memory location, whereas for chklb, control will be transferred if the type tag does not match the type of data at the memory location.
3. chklw—This instruction supports operands including a source memory location operand indicating a memory location of data to be loaded, a destination memory location operand indicating a word-sized register to which the data is meant to be loaded, and a type tag operand indicating a word-sized register from which a type tag that represents the type of data to be loaded is obtained.
4. chklwn—This instruction is substantially similar to chklw, except that the result of the tag comparison is negated before determining whether control should be transferred to the error handler location.

The checked load instructions are executed in a manner similar to that of a standard load. However, the type of data within the source memory location is checked during the instruction. To check the type of the data, a portion of the source memory location is compared to the type tag. For example, for the chklb instruction, when the value at the source memory location is accessed from the cache, the most significant byte of the value is compared to the value of the type tag operand. As another example, for the chklw instruction, when the value at the source memory location is accessed from the cache, the first word of the cache line is compared to the value of the type tag operand. For implementation efficiency, in some embodiments the source memory location may be cache-block-aligned. If the comparison fails (or is successful, in the case of the negated operands), execution is transferred to the instruction indicated at the error handler instruction location.

One of ordinary skill in the art will understand that while example instructions are listed and described herein, other similar instructions may be implemented and used without departing from the scope of the present disclosure. For example, different names may be used for the instructions, memory locations and type tags of different sizes may be used, more or fewer operands may be used, data may be passed to the instructions using registers instead of operands (or vice versa), and/or the like. Further, one of ordinary skill in the art will understand that, in some embodiments, more or fewer instructions than the four described above may be implemented and/or used.

Figure 2A:
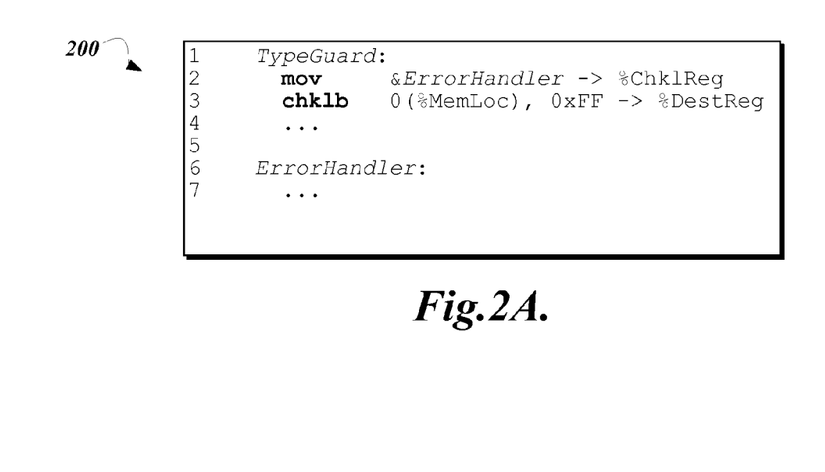
FIGS. 2A and 2B are code samples that illustrate two exemplary embodiments of assembly code listings that use checked load instructions for type checking, according to various aspects of the present disclosure.
Figure 2B:
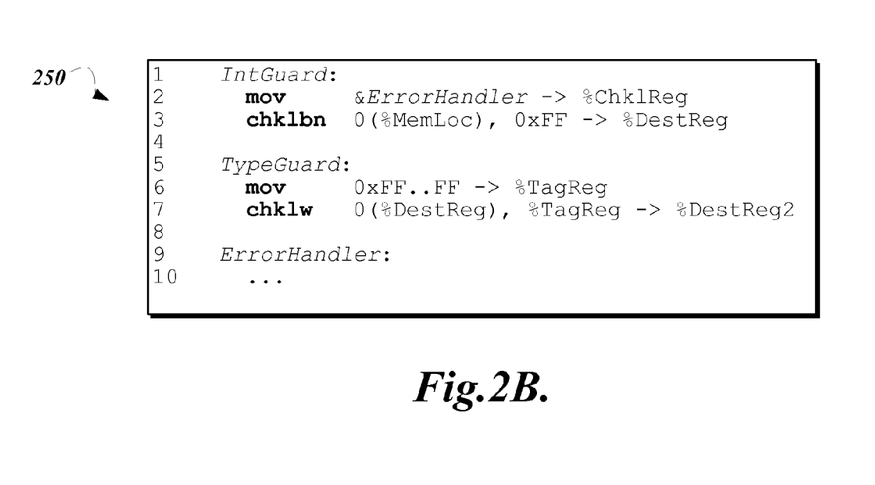

FIGS. 2A and 2B are code samples that illustrate two exemplary embodiments of assembly code listings that use checked load instructions for type checking, according to various aspects of the present disclosure. The code sample 200 of FIG. 2A illustrates a guard on a memory location to check if it is an integer. At line 2, the location of the error handler is stored in the type check register. Next, at line 3, instead of a traditional load instruction, the chklb instruction is used. If the type comparison completes successfully, the value loaded into the destination register may be used in its current state for integer arithmetic, as the most significant byte is used for the tag comparison and the type tag for integers is all-ones (as discussed above). If the type comparison fails, execution is transferred to the error handler location stored in the type check register.

FIG. 2B illustrates a guard on a memory location to ensure that it contains an object-like value of a particular type. In this example, there are two levels of indirection in accessing the value at the memory location. First, a pointer to the value is loaded from a virtual register, and that value is guarded against being an integer. Then, an offset from that pointer is dereferenced to access and type check the actual data.

At line 2 of the code sample 250, the location of the error handler is stored in the type check register. At line 3, a chklbn instruction is used to load a value from a virtual register, with an immediate value indicating the integer type as the type tag operand. When the load from the virtual register occurs, the data is checked to ensure that it is not an integer. Assuming this type check is successful, the value loaded from the virtual register may be treated as a pointer. At line 6, a type tag value is loaded into another virtual register. At line 7, a chklw instruction is used to load the value referenced by the pointer, and to check its type using the type tag value in the type tag operand.

Figure 3:
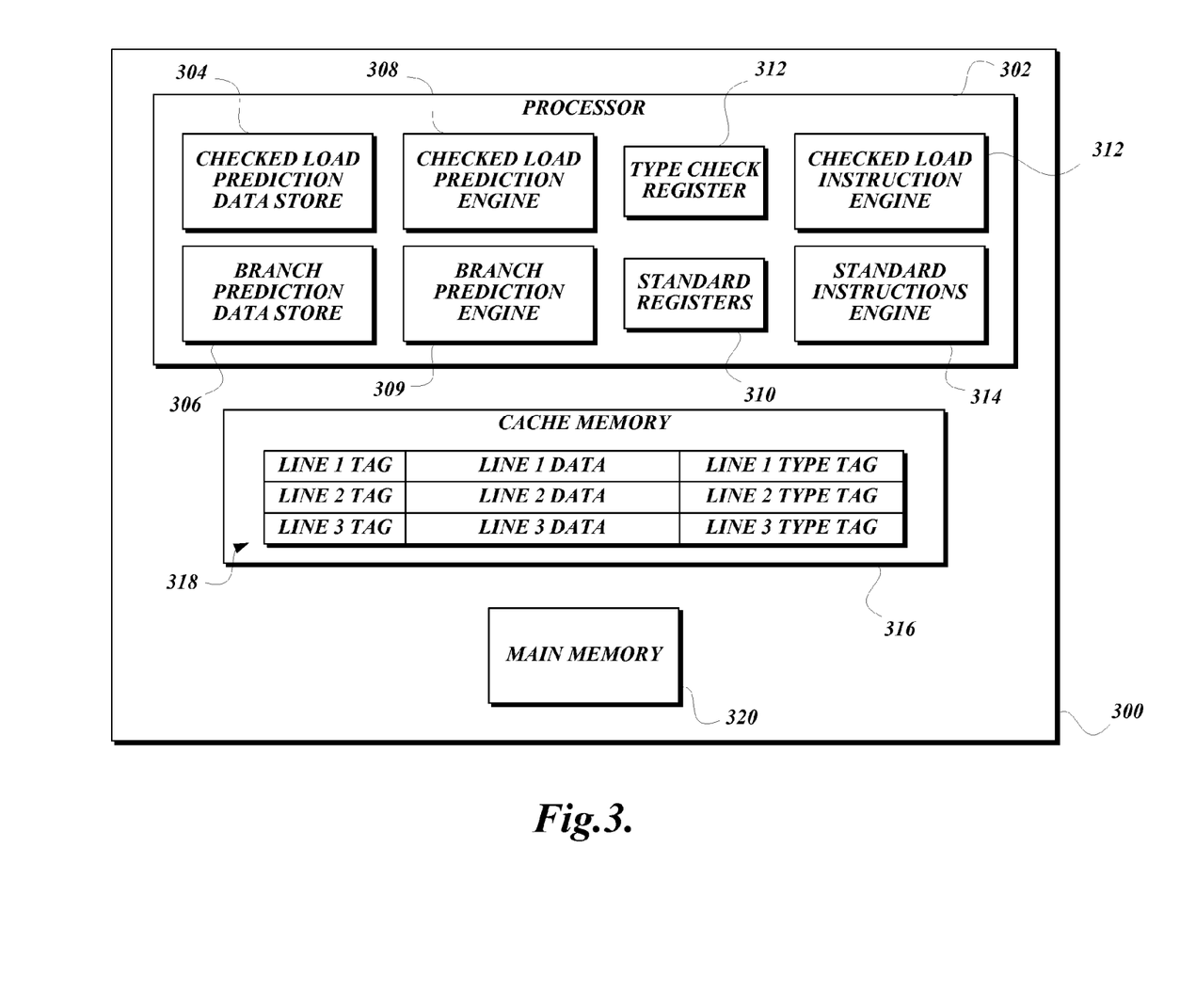
FIG. 3 is a block diagram that illustrates, at a high level, aspects of an exemplary computing device configured to implement an embodiment of the present disclosure.

FIG. 3 is a block diagram that illustrates, at a high level, aspects of an exemplary computing device 300 configured to implement an embodiment of the present disclosure. The computing device 300 may be any type of computing device currently available. Though mobile computing devices such as smart phones, tablet computing devices, and/or the like may particularly benefit by including embodiments of the present disclosure, any other type of computing device, such as a desktop computer, laptop computer, server computer, embedded computing device, cloud computing device, and/or the like may be used.

As illustrated, the computing device 300 includes a processor 302, a cache memory 316, and a main memory 320. One of ordinary skill in the art will recognize that the computing device 300 may include many other components, such as display interfaces, input devices, internal communication buses, network interface devices, removable computer-readable storage media readers, and/or the like, but such well-known components have been omitted from FIG. 3 and from this description for ease of discussion.

The processor 302 includes a number of components that are generally available in modern processors. For example, FIG. 3 illustrates a standard instructions engine 314 which is configured to execute instructions defined in a well-known instruction set architecture, and a set of standard registers 310 which are defined in the well-known instruction set architecture. For example, the standard instructions engine 314 may be configured to execute the instructions defined by the x86 instruction set architecture, and the standard registers 310 may include the registers defined by the x86 instruction set architecture (though other instruction set architectures may be used). A branch prediction engine 309 monitors the execution of instructions in order to predict likely future results of branch instructions, and stores data related to such predictions in a branch prediction data store 306.

To support checked load instructions, the processor 302 may altered to include a checked load instruction engine 312 and a type check register 312. As discussed above, the type check register 312 may be used to store an error handler location, so that execution may be transferred to the error handler upon failure of a type check. The checked load instruction engine 312 may be configured to execute one or more of the instructions discussed above. In some embodiments, the checked load instruction engine 312 and the type check register 312 may be separate from the standard instructions engine 314 and the standard registers 310, as illustrated in FIG. 3. FIG. 3 illustrates these components separately for ease of discussion only. In other embodiments, the checked load instruction engine 312 may be merged with the standard instructions engine 314 so that a single instruction engine executes all instructions in the processor 302. Likewise, in some embodiments, the type check register 312 and the standard registers 310 may be merged into a single component.

In some embodiments, failure of a checked load instruction may itself be an expensive calculation, and added efficiencies may be obtained by jumping directly to the error handler location upon predicting that a type check is likely to fail. This prediction may be performed by the branch prediction engine 309 as if it were any other branch instruction. However, further efficiencies may be obtained if type checks are predicted separately from other branch instructions. Accordingly, in some embodiments, the processor 302 may include a checked load prediction engine 308 and a checked load prediction data store 304. In some embodiments, some or all of the checked load prediction data store 304 and/or the checked load prediction engine 308 may be merged with the branch prediction data store 306 and the branch prediction engine 309. Further description of checked load prediction is provided below.

As understood by one of ordinary skill in the art, when the processor 302 attempts to access a memory location, it requests the memory location from the cache memory 316. If the memory location is not present in a cache line 318 of the cache memory 316, the memory location is loaded from main memory 320 into a cache line 318 before being provided to the processor 302. As illustrated, each cache line 318 includes a tag portion, data portion and a type tag portion. As understood by one of ordinary skill in the art, the tag portion includes at least some of the address of the actual data fetched from main memory. The type tag portion includes a type tag identifying a type of data stored in the cache line. In some embodiments, data may be laid out in the main memory 320 such that a cache line 318 may be filled with data all of the same type. Accordingly, one type tag in a known location in the cache line 318 may identify the type of all of the data stored in the cache line 318. In some embodiments, checked loads may only be effective for data that is properly aligned at the beginning or end of a cache line 318, and so the data may be laid out in main memory 320 or the cache memory 316 accordingly. Each cache line 318 may include further information such as flags and/or the like, but these well-known features have been omitted for clarity.

Figure 4:
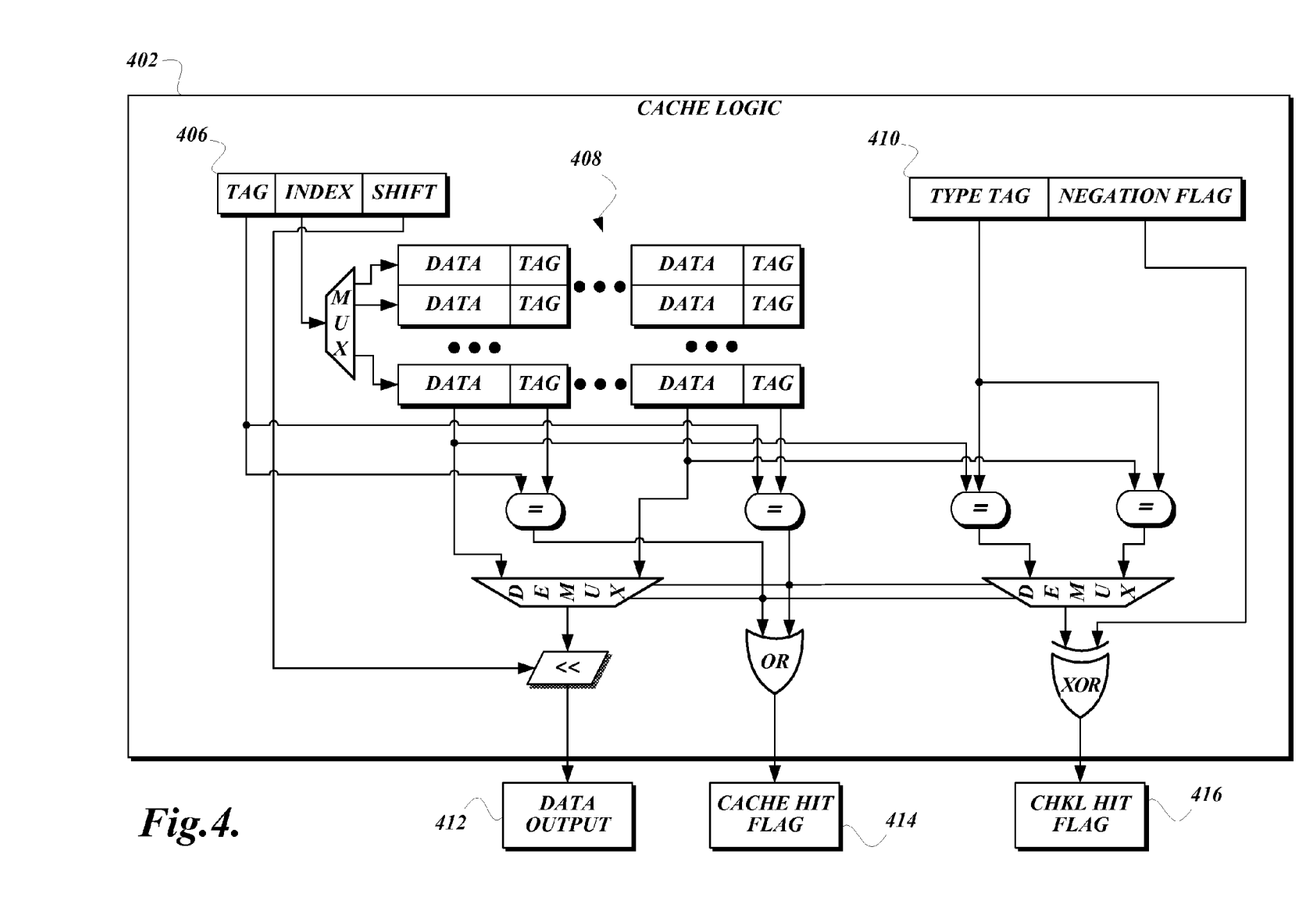
FIG. 4 is a schematic diagram that illustrates further details of an exemplary embodiment of one implementation of type checking according to various aspects of the present disclosure.

FIG. 4 is a schematic diagram that illustrates further details of an exemplary embodiment of one implementation of type checking according to various aspects of the present disclosure. The cache logic 402 is configured to receive memory address information 406. The memory address information 406 includes a tag, an index, and a shift value. The index value is used to select one or more cache lines out of a set of cache lines 408 in which data from the memory address may be stored. The tag value is compared to a tag stored in the cache lines to determine whether data from the memory address is present in the set of cache lines 408. If the tag value from the memory address information 406 matches a tag value in one of the cache lines 408, a cache hit is determined, and the output cache hit flag 414 returns TRUE, and the shift value is used to shift the data from the cache line to obtain the desired data output value 412. One of ordinary skill in the art will recognize that this logic is similar to traditional cache logic.

To implement checked load logic, the cache logic 402 is also configured to receive checked load information 410. The checked load information 410 includes a type tag that indicates the type to be checked for and a negation flag that indicates if the result of the type comparison should be negated (to support, for example, instructions such as the chklbn and chklwn instructions described above). On a cache hit, in parallel with the traditional cache tag comparison discussed in the previous paragraph, the type tag is compared to a relevant part of the data portion of the selected cache line. The result of the comparison is XORed with the negation flag, and is used to generate the checked load hit flag output 416. If the checked load hit flag output 416 is FALSE, the error handler instruction location is copied to the program counter to transfer execution to the error handler instruction.

In some embodiments, checked load instructions may be used to load values that are cache-line aligned. In other words, each value coincides with the first word of a cache line. In such embodiments, the comparison of the type tag in the checked load information 410 may be wired to a given word of each way of the cache, so that the logic for comparing the type tag is no deeper than the logic for comparing the cache tag, and so checked load logic may be added to an instruction set architecture without lengthening the cache critical path. This allows support for checked load instructions to be added to an instruction set architecture without impacting the cycle counts of other instructions or the cycle time of the processor.

One of ordinary skill in the art will recognize that the implementation discussed above of type checking logic within the cache logic is exemplary only, and will also recognize that, in other embodiments, the type checking logic may be implemented using other techniques (such as within the processor) without departing from the scope of the present disclosure.

Figure 5A:
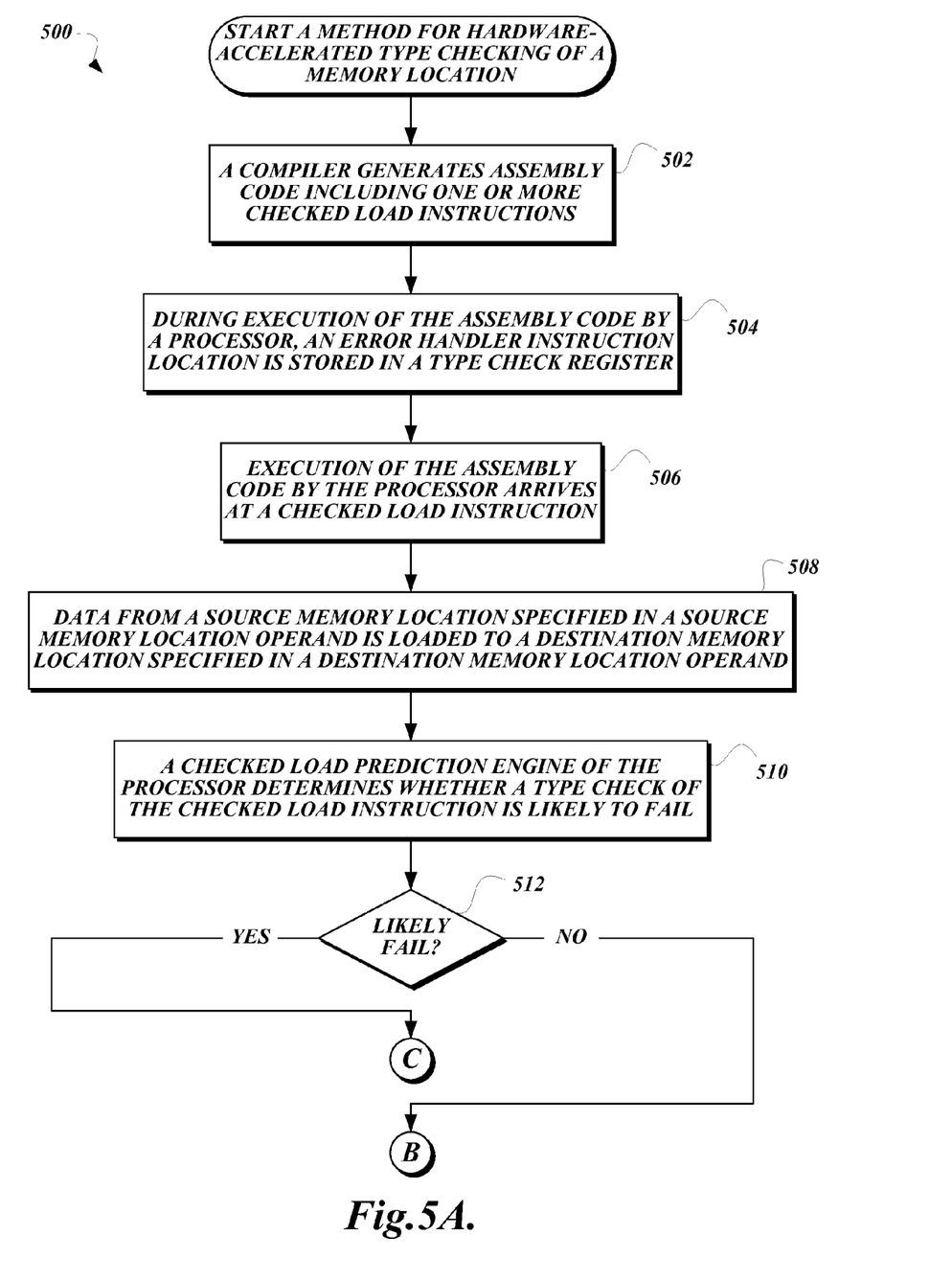
FIGS. 5A and 5B are a flowchart that illustrates an exemplary embodiment of a method for hardware-accelerated type checking of a memory location according to various aspects of the present disclosure.
Figure 5B:
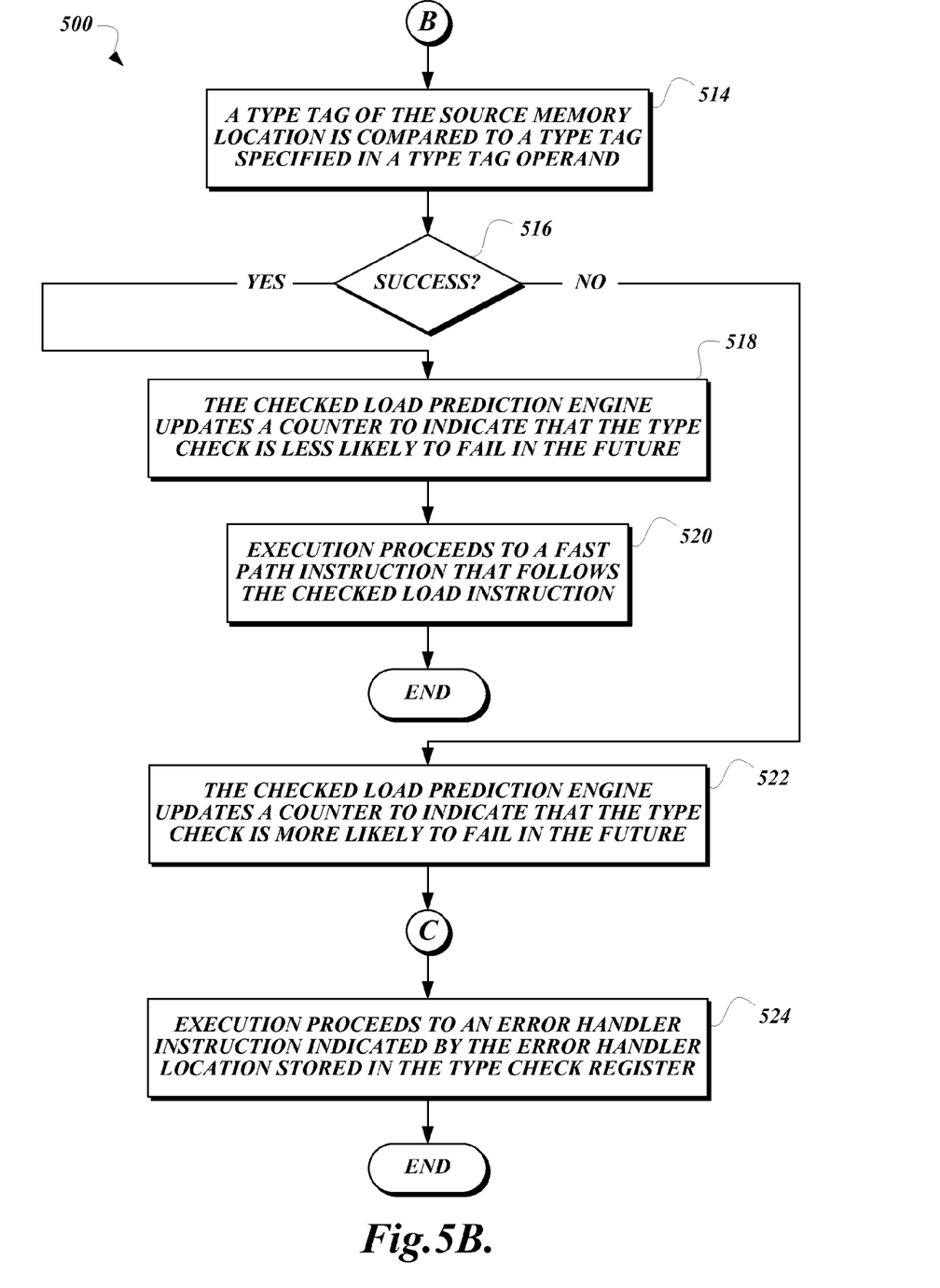

FIGS. 5A and 5B are a flowchart that illustrates an exemplary embodiment of a method for hardware-accelerated type checking of a memory location according to various aspects of the present disclosure. From a start block, the method 500 proceeds to block 502, where a compiler generates assembly code including one or more checked load instructions.

At a high level, the code generation may follow an optimistic policy in which code for a "fast path" is generated assuming that the type check will pass in place of the first load from the guarded object. Transfer of control to an error handler instruction is performed by the hardware within the checked load instruction, and so no additional assembly code need be generated to transfer control to the error handler instruction beyond the initial loading of the error handler instruction location to the type check register. A single such handler may be reused for an entire VM-level macro-op worth of instructions (corresponding approximately to a single line of JavaScript source code). In other embodiments, different levels of failure granularity may be used, though the one-handler-per-macro-op level of granularity may provide a desired balance between a complexity of code generation and an exposure of more optimization opportunities to the purely local code generator. For example, if the cost of setting the type check register for each macro-op proved to be detrimental, the type check register could be set less frequently, at the cost of slightly generalizing the error handler generated by the virtual machine.

Once code generation is complete, the assembly code or machine code is executed by a processor 302. Eventually, execution of the assembly code will reach a type check implemented with a checked load instruction. At block 504, during execution of the assembly code by the processor 302, an error handler instruction location is stored in a type check register 312. Next, at block 506, execution of the assembly code by the processor 302 arrives at a checked load instruction. The checked load instruction may be any of the instructions listed and described above, or may be a similar instruction that causes the processor 302 to perform type checking in a similar way.

At block 508, data from a source memory location specified in a source memory location operand is loaded to a destination memory location specified in a destination memory location operand. In some embodiments, the actions described with respect to block 508 may be performed during each execution of a checked load instruction. In some embodiments, the actions described with respect to block 508 may only be performed during execution of checked load instructions in which the type check passes. Accordingly, the actions described with respect to block 508 may be performed at this point in the method 302, at a point in the method 302 after the type check is performed, or at any other suitable point in the method 302.

As discussed above, the load of data from the source memory location may include retrieving the data from a cache memory 316, and if data from the source memory location is not present in the cache memory 316, the data may be retrieved from main memory 320 and stored in the cache memory 316 before being loaded to the destination memory location. Similar to other load instructions, the destination memory location may be any suitable location, such as a register and/or the like.

In some embodiments, the method 300 may proceed to block 510, where a checked load prediction engine 308 of the processor 302 determines whether a type check of the checked load instruction is likely to fail. Detecting likely failures allows the processor 302 to skip type checks that are likely to fail and to jump directly to the error handler instruction in order to reduce the cost of such failures. A similar prediction algorithm may be used by the checked load prediction engine 308 to predict type check failures as is used by the branch prediction engine 309 to predict branches: the checked load prediction engine 308 receives an instruction address and a branch history, and generates a bit which indicates whether the type check at the instruction address is likely to fail or not.

In some embodiments, a standard correlated predictor, such as a gshare predictor, may be used to predict type check failures. In particular, in some embodiments, the checked load prediction data store 304 may include a 4096-entry type check history table similar to a branch history table, and a 12-bit type check history register similar to a branch history register. The checked load prediction engine 308 may be configured to dynamically map each combination of a checked load instruction address (or program counter address) and a value of the check history register, using an XOR hash function, to a 2-bit saturating counter in the check history table. The value of the counter is used by the checked load prediction engine 308 to predict whether the checked load instruction is likely to fail.

One of ordinary skill in the art will understand how a typical branch prediction engine 309 would operate, and so detailed descriptions of the operation of the branch prediction engine 309 and the checked load prediction engine 308 are not provided herein. Further, in some embodiments, the checked load prediction data store 304, the branch prediction data store 306, the checked load prediction engine 308, and/or the branch prediction engine 309 may share hardware and/or storage space in order to reduce the resources needed for type prediction. For example, in some embodiments, one set of prediction hardware may be used, and the prediction tables for branches and checked load instructions may be combined into a single table while preserving distinct 12-bit history registers for each.

Once a suitable prediction of the outcome of the checked load instruction is generated at block 510, the method 300 proceeds to a decision block 512, where a test is performed as to whether the output of the checked load prediction engine indicates that the type check in the checked load instruction is likely to fail. If the result of the test at decision block 512 is YES, then the method 300 proceeds to a first continuation terminal ("terminal C"). Otherwise, if the result of the test at decision block 512 is NO, then the method 300 proceeds to a second continuation terminal ("terminal B").

From terminal B (FIG. 5B), the method 500 proceeds to block 514, where a type tag of the source memory location is compared to a type tag specified in a type tag operand. At decision block 516, a test is performed to determine if the type check was successful. Depending on the particular checked load instruction being performed, the type check may be successful if the type tag specified in the type tag operand matches the type tag of the source memory location, or the type check may be successful if the type tag specified in the type tag operand does not match the type tag of the source memory location (in the case of negated instructions).

If the result of the test at decision block 516 is YES, then the method 500 proceeds to block 518, where the checked load prediction engine 308 updates a counter to indicate that the type check is less likely to fail in the future, based on the fact that the type check did not fail during the present execution. As discussed above, this counter may be a 2-bit saturating counter stored in the checked load prediction data store 304 and associated with the checked load instruction and the current type check history. At block 520, execution proceeds to a fast path instruction that follows the checked load instruction. The method 500 then proceeds to an end block and terminates.

Otherwise, if the result of the test at decision block 516 is NO, then the method 500 proceeds to block 522, where the checked load prediction engine 308 updates a counter (such as the 2-bit saturating counter discussed in the previous paragraph) to indicate that the type check is more likely to fail in the future, based on the fact that the type check failed during the present execution. The method 500 then proceeds to terminal C, and then to block 524, where execution proceeds to the error handler instruction indicated by the error handler location stored in the type check register. The method 500 then proceeds to an end block and terminates.

One of ordinary skill in the art will recognize that certain steps in the method 500 may be optional, and/or may be executed in an order different from that illustrated in FIGS. 5A-5B, and/or may be executed in parallel. Also, one of ordinary skill in the art will recognize that portions of the method 500 may be repeated upon reaching one of the end blocks as the processor continues to execute the assembly code. For example, from either of the end blocks, the method 500 may proceed to block 504, as execution approaches another checked load instruction. Further, in some embodiments the use of type prediction may be optional. In such embodiments, the blocks relating to type prediction (e.g., blocks 510, 512, 518, and 522) may be omitted.

Though JavaScript is primarily mentioned and discussed above, one of ordinary skill in the art will recognize that the devices and methods disclosed herein may be applied to other dynamically typed languages. For example, embodiments of the present disclosure may also be useful in providing hardware-based support for dynamic type checking in Python, Ruby, Lisp, Smalltalk, PHP, Tcl, or any other dynamically typed language.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A computing device configured to execute dynamically typed programming languages, the computing device comprising:
   circuitry configured to execute a checked load instruction; and
   a type check register configured to store a location of an error handler;
   wherein the checked load instruction is configured to accept at least a source memory location operand, a destination memory location operand, and a type tag operand.

2. The computing device of claim 1, wherein the computing device further comprises:
   a memory device that includes a plurality of lines;
   wherein each line of the memory device includes a portion for storing a type tag that represents a type of data stored in the line.

3. The computing device of claim 2, wherein the memory device is a cache memory.

4. The computing device of claim 1, wherein the computing device further comprises circuitry configured to execute a negated checked load instruction.

5. The computing device of claim 1, wherein to execute the checked load instruction, the circuitry is configured to:
   compare a type tag associated with a memory location specified in the source memory location operand to a type tag specified in the type tag operand; and
   in response to a comparison indicating a type mismatch, cause execution to branch to an instruction at a location specified in the type check register.

6. The computing device of claim 1, wherein to execute the checked load instruction, the circuitry is further configured to load data from a memory location indicated by the source memory location operand to a memory location indicated by the destination memory location operand.

7. The computing device of claim 1, further comprising a checked load prediction engine configured to predict whether a checked load instruction is likely to cause execution to branch to an instruction at a location specified in an error handler location operand.

8. The computing device of claim 7, further comprising a checked load prediction data store.

9. The computing device of claim 8, wherein the checked load prediction data store includes a history table and a history register, wherein the checked load prediction engine is configured to:
   map each combination of a checked load instruction address in a program to be executed and a history register value to a two-bit saturating counter in the history table;
   use a value of the counter to predict a success or a failure of a type comparison performed in a checked load instruction specified by the checked load instruction address; and
   update the counter upon resolution of the checked load instruction.

10. The computing device of claim 8, wherein the checked load prediction data store is separate from a branch prediction data store and the checked load prediction engine is separate from a branch prediction engine.

11. The computing device of claim 8, wherein the checked load prediction data store is merged with a branch prediction data store.

12. The computing device of claim 7, wherein a single set of prediction hardware is configured to provide the checked load prediction engine and a branch prediction engine.

13. The computing device of claim 2, wherein the memory device further includes circuitry configured to compare a type tag associated with a memory location specified in the source memory location operand to a type tag specified in the type tag operand.

14. A method of performing type checking during execution of a program in a dynamically typed programming language, the method comprising:
    storing, in a type check register, an error handler instruction location;
    comparing a type tag specified in a type tag operand to a portion of memory associated with a source memory location indicated by a source memory location operand to determine whether the type tag matches a type specified in the portion of memory;
    in response to determining that the type tag matches the type specified in the portion of memory, transferring execution to a subsequent instruction; and
    in response to determining that the type tag does not match the type specified in the portion of memory, transferring execution to an instruction at the error handler instruction location stored in the type check register.

15. The method of claim 14, further comprising copying data from the source memory location to a destination memory location indicated by a destination memory location operand.

16. The method of claim 14, wherein comparing the type tag specified in the type tag operand to a portion of memory associated with a source memory location indicated by a source memory location operand includes:
    comparing a most significant byte of the portion of memory to an immediate value specified in the type tag operand.

17. The method of claim 14, wherein comparing the type tag specified in the type tag operand to a portion of memory associated with a source memory location indicated by a source memory location operand includes:
    comparing a first word of a cache line to a value stored in a word-sized register specified in the type tag operand.

18. The method of claim 14, further comprising negating a result of the comparison of the type tag specified in the type tag operand to the portion of memory associated with the source memory location indicated by the source memory location operand.

19. The method of claim 14, further comprising predicting a result of the comparison of the type tag specified in the type tag operand to the portion of memory associated with the source memory location indicated by the source memory location operand.

20. The method of claim 19, wherein predicting a result of the comparison includes:
    mapping each combination of a checked load instruction address in the program and a history register value to a two-bit saturating counter in the history table;
    using a value of the counter to predict success or failure of the comparison; and
    updating the counter upon resolution of a checked load instruction.

* * * * *